UNITED STATES PATENT OFFICE.

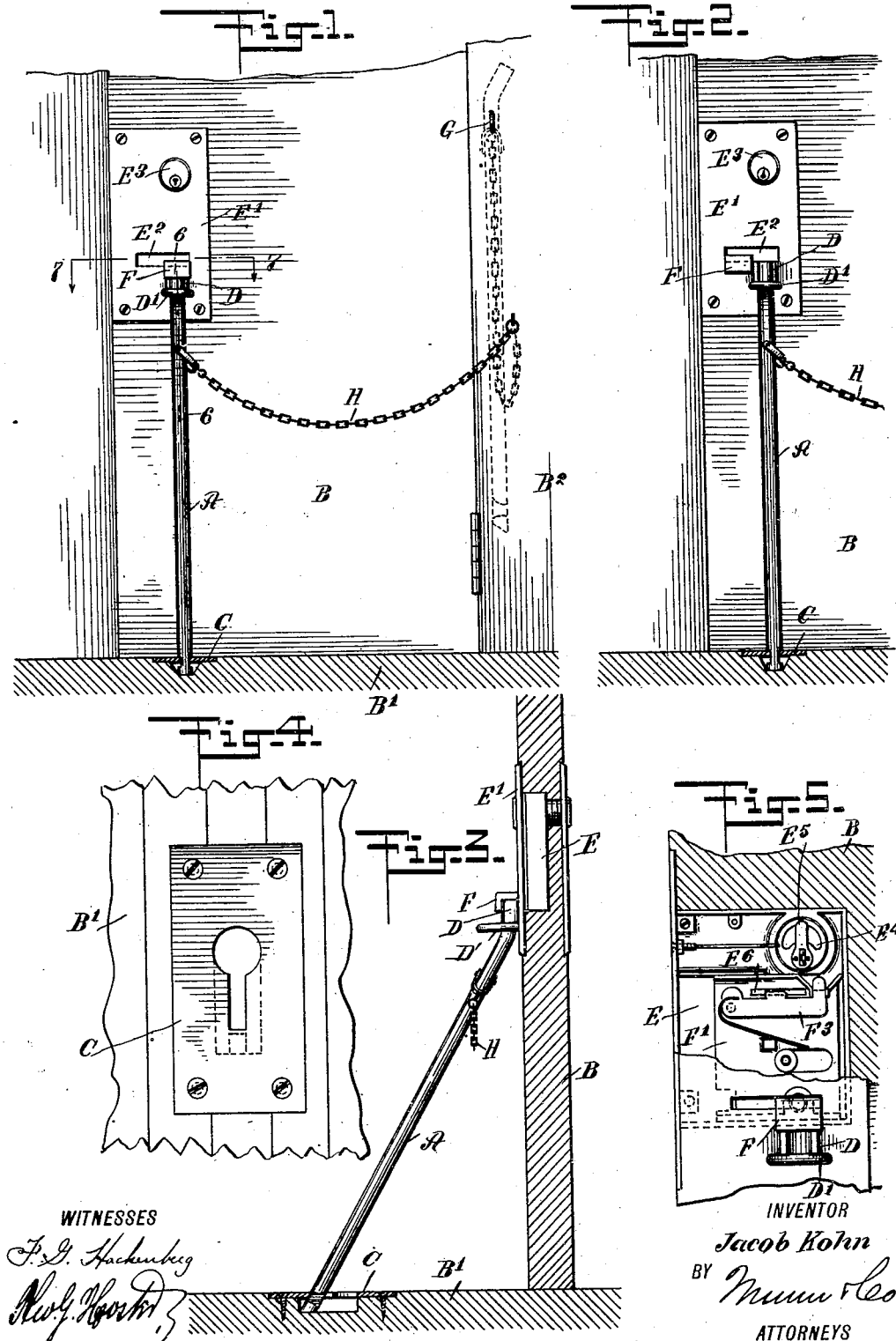

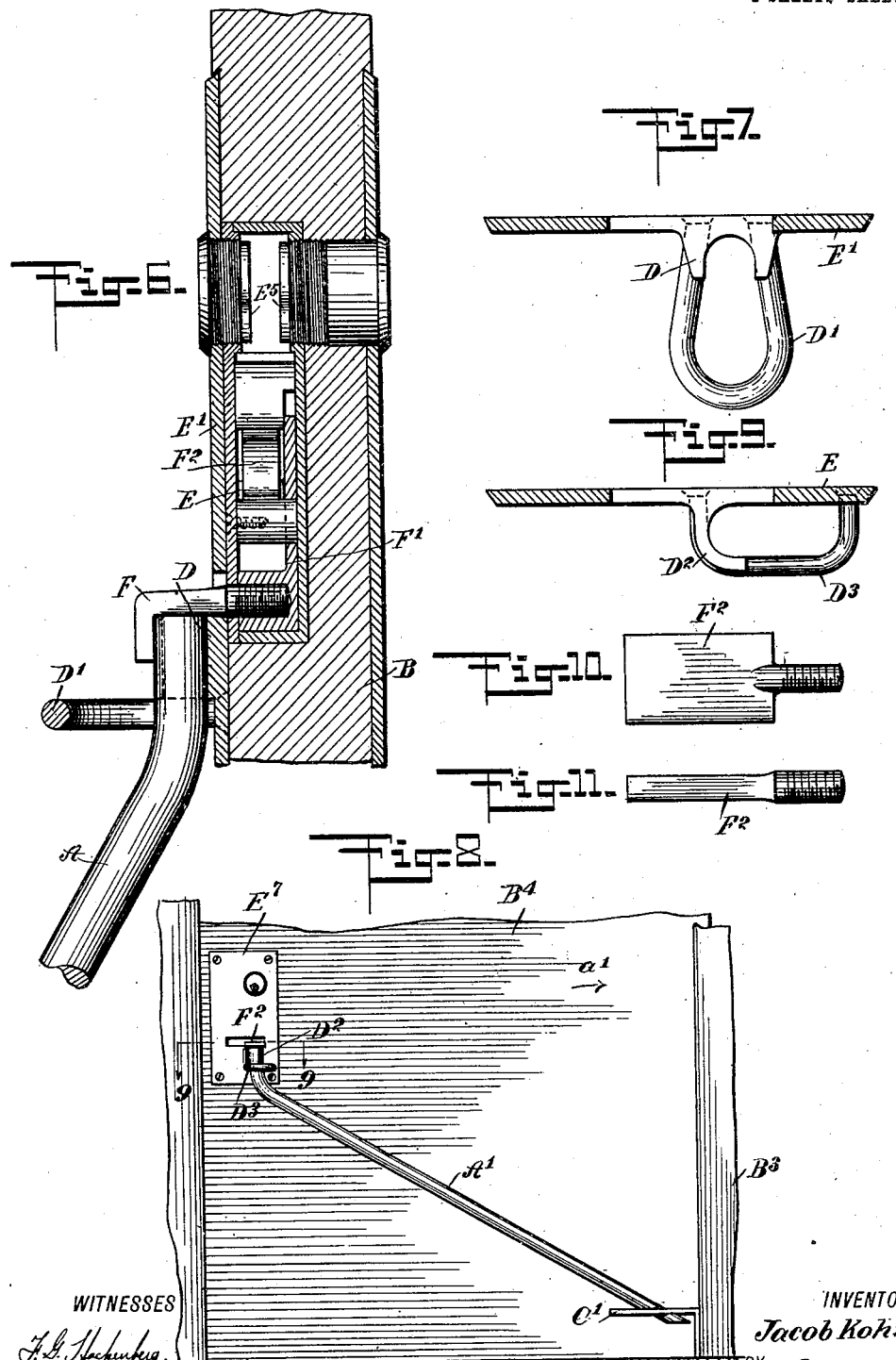

JACOB KOHN, OF NEW YORK, N. Y., ASSIGNOR TO EMIEL R. FUCHS, OF NEW YORK, N. Y.

DOOR-SECURER.

977,316.  Specification of Letters Patent.  Patented Nov. 29, 1910.

Application filed June 17, 1909. Serial No. 502,702.

*To all whom it may concern:*

Be it known that I, JACOB KOHN, a subject of the King of Hungary, and a resident of the city of New York, borough of Manhattan, in the county and State of New York, have invented a new and Improved Door-Securer, of which the following is a full, clear, and exact description.

The invention relates to door securers, having a door-securing bar set in an abutment in the floor and resting against the door at an angle thereto, to hold the door against opening.

The object of the invention is to provide a new and improved door securer, for convenient application to hinged or sliding doors, and arranged to securely hold the door against opening by unauthorized persons, and to allow convenient opening of the door by the proper person without removing the door-securing bar.

For the purpose mentioned, the door-securing bar is set in an abutment on the floor and is adapted to be engaged at the top by a key-controlled means on the door.

A practical embodiment of the invention is represented in the accompanying drawings forming a part of this specification, in which similar characters of reference indicate corresponding parts in all the views.

Figure 1 is an elevation of a hinged door and the door-securing bar locked in place, to hold the door against opening, the floor and the floor abutment being shown in section; Fig. 2 is a like view of the same and showing the bar unlocked by the key-controlled means; Fig. 3 is a cross section of the same; Fig. 4 is an enlarged plan view of the floor abutment; Fig. 5 is a face view of the key-controlled means for locking or unlocking the bar, part of the lock plate being broken out and the door being shown in section; Fig. 6 is an enlarged cross section of the improvement on the line 6—6 of Fig. 1; Fig. 7 is an enlarged sectional plan view of the lock plate, the section being on the lin 7—7 of Fig. 1; Fig. 8 is a face view of a sliding door provided with the improvement; Fig. 9 is an enlarged sectional plan view of the door plate and the guide for the door-securing bar; Fig. 10 is a plan view of the locking slide for the bar; and Fig. 11 is an edge view of the same.

As illustrated in Figs. 1 to 7, the door-securing bar A for holding the hinged door B against forcible opening is set at its lower end in an abutment C, arranged in the floor B' adjacent to the door B, as plainly indicated in Fig. 3. The upper end of the bar A is adapted to be seated in a seat D, formed on the door plate E', covering the lock E, of any approved construction, and mortised in the door B, as shown in Figs. 3, 5 and 6. Immediately below the seat D is arranged an elongated loop D', forming with the said seat a guide for the upper end of the bar A, and the top of the bar A is adapted to be engaged by a locking slide F, mounted to slide sidewise and controlled from the mechanism of the lock E in such a manner that when the lock E is in a closed position, the slide F extends over the top of the bar A, as shown in Figs. 1, 3 and 6, and when the lock E is unlocked, by the use of the proper key, either from the outside or the inside, then the slide F is moved to one side, out of engagement with the top of the bar A, as illustrated in Fig. 2. Thus when the slide F extends over the top of the bar A, it is evident that the bar is held against movement, and consequently the door B is held closed against forcible entry by an unauthorized person; but when the door is unlocked by the proper person unlocking the lock E, then the slide F is moved to one side, out of engagement with the top of the bar A, to allow of opening the door a sufficient distance for the person to pass through the door opening, it being understood that when the door is opened the bar A is free to swing in a transverse direction, the abutment C being the fulcrum and the upper end of the bar being guided in the guide formed of the seat D and the loop D'. The slide F is preferably L-shaped in cross section, as plainly indicated in Figs. 3 and 6, so as to engage not only the top of the bar A but also to extend over the front upper end of the bar, to hold the latter positively against a transverse swinging movement as long as the slide F is in active position over the bar A.

The slide F extends through an elongated slot E² in the door plate E', and the inner end of the slide F is secured to a plate F', mounted to slide sidewise in the lock E and controlled by the operating mechanism thereof. As any suitable mechanism may be employed for moving the slide F sidewise for the purpose mentioned, it is deemed sufficient to state that the cylinder lock shown is provided with inside and outside cylinders E³, E⁴, adapted to be turned by the proper key and carrying at their inner ends arms E⁵ for engagement with the plate F', to shift the latter sidewise, the plate F' being normally locked against movement by a spring-pressed lever F³, fulcrumed on the plate F', and adapted to engage a lug E⁶ fixed on the lock E (see Fig. 5). When the key turns either cylinder E³ or E⁴, then the corresponding arm E⁵ first engages the lever F³ and swings the same downward out of engagement with the fixed lug E⁶, so that the plate F' is unlocked, and a further swinging of the arm E⁵ now engages the plate F', to shift the same sidewise and with it the slide F.

The door securer is more particularly designed for use during the night, and during the day the bar A may be disconnected from the seat D, the loop D' and the socket C and hung up on a suitable support G on the door casing B², as indicated in dotted lines in Fig. 1.

In order to prevent the bar from being lost or misplaced, a chain H connects the bar A with the door casing B², as plainly indicated in the drawings.

In the modified form shown in Figs. 8, 9, 10 and 11, the bar A' engages with its lower end an abutment C', attached to the door casing B³, in which the door B⁴ is mounted to slide, and the upper end of the side bar A' engages a seat D² and a loop D³ attached to the door plate E⁷, the same as above described in reference to the door plate E', the seat D and the loop D'. The slide F², for engaging the top of the bar A', is in the form of a flat plate, as plainly indicated in Figs. 8, 10 and 11, and is attached to the plate F', the same as the slide F previously explained, it being understood that the slide F² is key-controlled and moved sidewise, to pass over the top of the bar A' or out of contact with the same.

Now when the several parts are in the position as shown in Fig. 8, the door B⁴ is held against opening in the direction of the arrow a' by the bar A', as the locking slide F² engages the top of the said bar A'. Now when the door B⁴ is unlocked and the slide F² is moved to the left, out of engagement with the top of the bar A', then the door B⁴ is free to slide into an open position in the direction of the arrow a', as the bar A' is now free to swing to the right with the abutment C' as the fulcrum.

Having thus described my invention, I claim as new and desire to secure by Letters Patent:

1. A door securer, comprising a door-securing bar, an abutment on the floor against which the lower end of the said bar is set, and a key-controlled means on the door adapted to move over the top of the said bar to hold the latter against movement and the door against opening.

2. A door securer, comprising a door-securing bar, an abutment on the floor against which the lower end of the said bar is set, a guide on the door for engagement by the upper end of the said bar, and a key-controlled means on the door adapted to move over the top of the said bar to hold the latter against movement and the door against opening.

3. A door securer, comprising a door-securing bar, an abutment engaged by the lower end of the bar, and a key controlled locking slide slidable sidewise and adapted to pass over the top of the said bar.

4. A door securer, comprising a door securing bar, an abutment against which the lower end of the bar is set, a key controlled locking slide slidable sidewise on the door and adapted to pass over the top of the said bar, and a guide on the door for the upper end of the said bar, the said guide being formed of a seat and an elongated loop.

5. A door securer, comprising a door securing bar, an abutment against which the lower end of the said bar is set, a key controlled locking slide, and a plate on the door having an elongated slot through which the said slide extends, said slide being slidable sidewise and adapted to pass over the top of the said bar, to hold the latter against movement.

6. A door securer, comprising a door securing bar, an abutment engaged by the lower end of the bar, a key controlled lock on the door, a plate mounted to slide sidewise in the lock and controlled by the operating mechanism of the lock, and a locking slide carried by said plate and adapted to pass over the top of said bar or out of contact with the same.

7. Door-securing means comprising a bar, floor and door abutments for the respective ends thereof, a casing in which the door abutment is relatively movable, and key-actuated means for bodily moving said door abutment into and out of locking engagement with the upper end of the bar.

In testimony whereof I have signed my name to this specification in the presence of two subscribing witnesses.

JACOB KOHN.

Witnesses:
  THEO. G. HOSTER,
  PHILIP D. ROLLHAUS.